(12) United States Patent
Musso et al.

(10) Patent No.: US 6,183,529 B1
(45) Date of Patent: Feb. 6, 2001

(54) HIGH TEMPERATURE GAS FILTER ASSEMBLY

(75) Inventors: José A. Musso, Setauket, NY (US); Zbigniew M. Janikowski, Rocky Hill, CT (US); Waldemar H. Krause, Remscheid (DE)

(73) Assignee: GKN Sinter Metals, Inc., Auburn Hills, MI (US)

( * ) Notice: Under 35 U.S.C. 154(b), the term of this patent shall be extended for 0 days.

(21) Appl. No.: 09/323,296

(22) Filed: Jun. 1, 1999

(51) Int. Cl.[7] .................................................. B01D 46/24
(52) U.S. Cl. .................. 55/484; 55/493; 55/502; 55/508; 55/523
(58) Field of Search .......................... 55/378, 484, 480, 55/493, 504, 507, 508, 502, 523

(56) References Cited

U.S. PATENT DOCUMENTS

| 4,735,638 | | 4/1988 | Ciliberti et al. | |
|---|---|---|---|---|
| 4,764,190 | | 8/1988 | Israelson et al. | |
| 4,767,427 | * | 8/1988 | Barabas et al. | 55/508 |
| 4,839,048 | * | 6/1989 | Reed et al. | 55/502 |
| 4,960,448 | | 10/1990 | Zievers . | |
| 5,185,019 | * | 2/1993 | Haldipur et al. | 55/378 |
| 5,296,010 | * | 3/1994 | Clarkk et al. | 55/523 |
| 5,401,406 | * | 3/1995 | Johnson et al. | 55/523 |
| 5,433,771 | * | 7/1995 | Bachovin et al. | 55/523 |
| 5,474,586 | * | 12/1995 | Eaton et al. | 55/523 |
| 5,564,755 | * | 10/1996 | Ackermann et al. | 55/523 |
| 5,766,467 | * | 6/1998 | Rech et al. | 55/508 |
| 5,876,471 | * | 3/1999 | Lippert et al. | 55/484 |

* cited by examiner

Primary Examiner—Duane S. Smith
(74) Attorney, Agent, or Firm—Woodcock Washburn Kurtz Mackiewicz & Norris

(57) ABSTRACT

A filter assembly for use with a gas filtration system for separating particles from a high temperature gas stream is disclosed, the gas filtration system having a support member. The filter assembly includes an adapter adapted to be connected to the support member and having an opening extending therethrough. A filter element is removably connected to the adapter and extends through the opening for separating the particles from the gas stream. A removable clamping device engages the adapter and the filter element for removably connecting the filter element to the adapter.

15 Claims, 1 Drawing Sheet

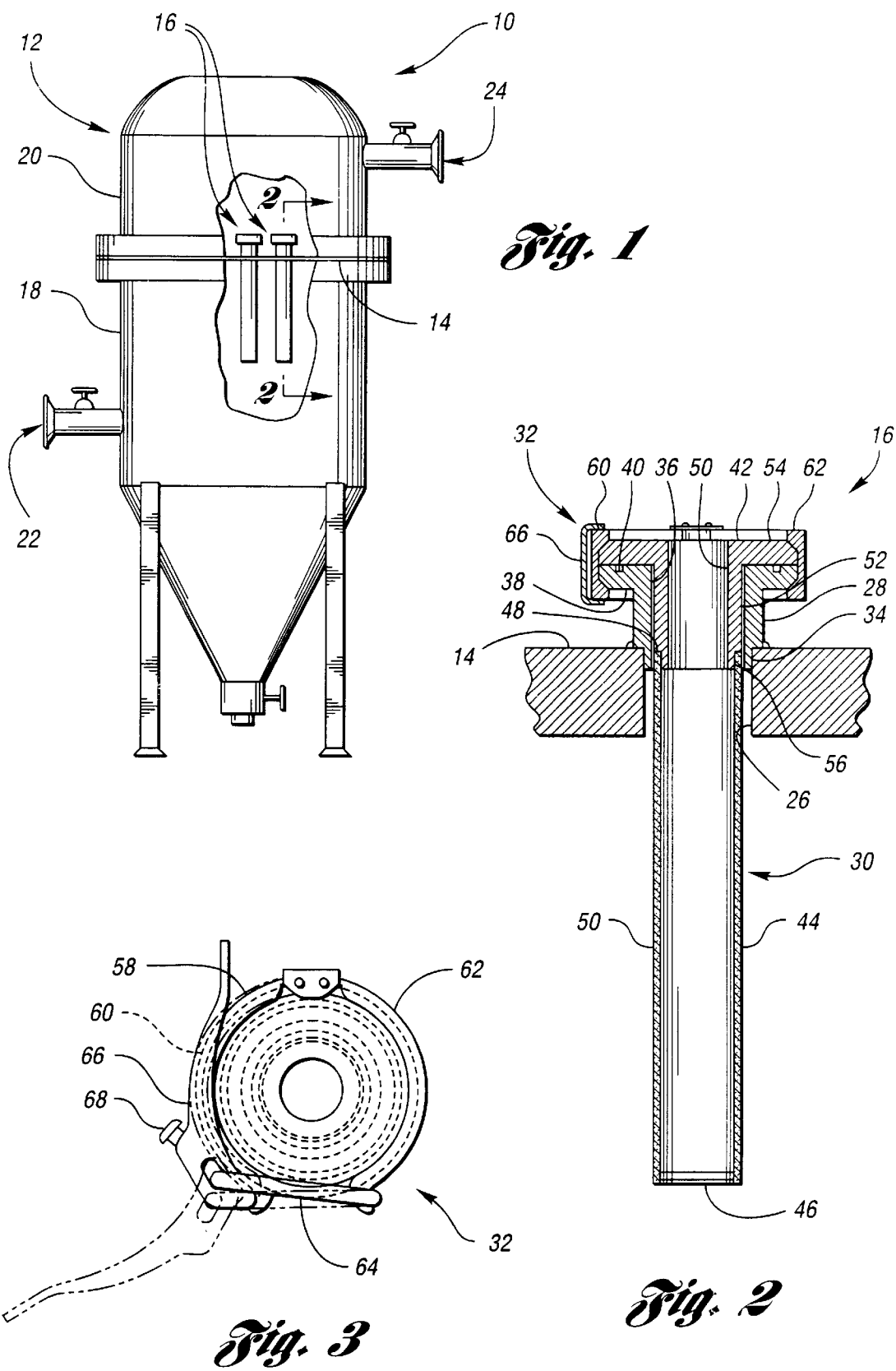

HIGH TEMPERATURE GAS FILTER ASSEMBLY

TECHNICAL FIELD

The invention relates to a filter assembly for use with a high temperature gas filtration system having a support member, and more particularly to a filter assembly which can be quickly and easily installed on and removed from the support member.

BACKGROUND ART

Many industrial processes such as oil refining and polymer production require filtration of high temperature, high pressure gas streams to separate particles such as catalyst particles, waste particles, or other solids from the gas streams. A prior high temperature gas filtration system includes a vessel and a support plate or tube sheet which divides the vessel into upper and lower chambers. The tube sheet has a plurality of threaded apertures which receive a plurality of threaded filter elements for filtering a gas stream as it passes from one chamber to the other. One problem associated with such a filtration system is that gulling or fusing of the filter elements to the tube sheet may occur along the threaded surfaces under certain circumstances. As a result, the filter elements may be difficult to remove from the tube sheet and may be damaged during such removal.

U.S. Pat. No. 4,960,448 to Zievers discloses another high temperature gas filtration system including a plurality of filter elements and a support plate having a plurality of apertures for receiving the filter elements, each aperture being surrounded by a ring extending upwardly from the support plate. Each filter element is connectable to the support plate using a pair of rods which extend through aligned holes in a respective ring and across the top of the filter element in abutment therewith. The rods, however, are typically difficult to install and remove, and cannot be adjusted to vary the compressive force exerted on a respective filter element to compensate for such things as gasket or seal yield.

Accordingly, a need exists for a filter assembly for use with a high temperature gas filtration system having a support member, wherein the filter assembly can be quickly and easily connected to and removed from the support member.

SUMMARY OF THE INVENTION

It is an object of the invention to provide an improved filter assembly which can be quickly and easily connected to and removed from a support member.

It is another object of the invention to provide a gas filtration system including such an improved filter assembly.

A more specific object of the invention is to provide an improved filter assembly including a threadless adapter adapted to be connected to the support member, and a threadless filter element removably connected to the adapter.

Another more specific object of the invention is to provide an improved filter assembly in which the adapter and the filter element have flange portions disposed adjacent to each other.

In carrying out these and other objects, features and advantages of the invention, there is provided a filter assembly for use with a gas filtration system for separating particles from a high temperature gas stream, the gas filtration system having a support member. The filter assembly comprises an adapter adapted to be connected to the support member and having an opening extending therethrough. A filter element is removably connected to the adapter and extends through the opening for separating the particles from the gas stream. A removable clamping device engages the adapter and the filter element for removably connecting the filter element to the adapter.

The present invention overcomes the above noted shortcomings of the prior art by providing an improved filter assembly including a filter element and a clamping device which enables the filter element to be quickly connected to and removed from a support member. Furthermore, the clamping device is preferably adjustable for varying the clamping forces exerted on the filter element.

BRIEF DESCRIPTION OF THE DRAWINGS

FIG. 1 is a side view partly broken away of a gas filtration system including multiple filter assemblies according to the invention;

FIG. 2 is a cross-sectional view of a filter assembly taken along line 2—2 of FIG. 1 in the direction of the arrows; and FIG. 3 is a top view of the filter assembly shown in FIG. 2.

BEST MODES FOR CARRYING OUT THE INVENTION

With reference to the drawings, the best modes for carrying out the invention will be described. FIG. 1 shows a high temperature gas filtration system 10 including a tank or vessel 12, a support member or tube sheet 14 and a plurality of filter assemblies 16, according to the invention, connected to the tube sheet 14. The vessel 12 includes first and second portions 18 and 20, respectively, joined together by fasteners or in any suitable manner. The first portion 18 has a gas stream inlet 22, and the second portion 20 has a gas stream outlet 24. The tube sheet 14 extends between the first and second portions 18 and 20, and separates the inlet 22 from the outlet 24. The tube sheet 14 has a plurality of apertures 26, one of which is shown in FIG. 2, for receiving the filter assemblies 16.

As further shown in FIG. 2, each filter assembly 16 includes a preferably threadless adapter 28, a preferably threadless filter element 30 connected to the adapter 28, and a clamping device 32 for securing the filter element to the adapter. The adapter 28 has a first recess 34 engaged with a respective aperture 26, and is preferably welded to the tube sheet 14. Alternatively, the adapter 28 may be connected to the tube sheet 14 in any suitable manner such as with fasteners, an adhesive, or by an interference fit, or the adapter may be formed integrally with the tube sheet. The adapter 28 further has a first opening 36 extending therethrough, and a first, radially extending flange portion 38 having an annular groove 40. A sealing device such as a metallic gasket or polymeric O-ring (not shown) is preferably disposed in the groove 40. The adapter 28 is preferably made of machined hastelloy, but it may be made of any suitable material and in any suitable manner.

The filter element 30 includes a fitting 42 and a preferably tubular, porous body portion 44 connected to the fitting and having a closed, first end 46, and an open, second end 48. The fitting 42 has second opening 50 extending therethrough, a preferably cylindrical projection 52 disposed within the first opening 36, and a second, radially extending flange portion 54 engaged with the first flange portion 38. The projection 52 preferably has a second recess 56 engaged with the body portion 44, and the fitting 42 is preferably welded to the body portion. Alternatively, the fitting 42 may be connected to the body portion 44 in any suitable manner such as by sinter bonding the fitting and the body portion together, or the fitting and the body portion may be formed integrally as a single piece. The fitting 42 and the body portion 44 are also preferably made of machined hastelloy, but they may be made of any suitable material and in any suitable manner.

As shown in FIG. 3, the clamping device 32 has a preferably ring-shaped body 58 having first and second sections 60 and 62, respectively, which are joinable together by an engaging mechanism such as a metal loop 64 connected to a lever 66. The loop 64 and lever 66 are shown in an engaging position in FIG. 3, with a disengaging position shown in phantom. When the loop 64 and lever 66 are in the engaging position, the sections 60 and 62 engage the first and second flange portions 38 and 54, thereby clamping the filter element 30 to the adapter 28. The clamping device 32 also preferably includes an adjustment mechanism such as a bolt or screw 68 for adjusting the clamping force exerted on the first and second flange portions 38 and 54. The clamping device 32 is available from Tri-Clover Corporation of Kinosha, Wis., and is identified as Model No. 13MHLA. Alternatively, any suitable clamping device may be used, such as a two-piece high pressure clamp joined together by stainless steel bolts. Such a clamping device is available from Tri-Clover Corporation of Kinosha, Wis., and is identified as Model No. 13MHP.

To assemble the filter assembly 16, the adapter 28 is preferably welded to the tube sheet 14 and the fitting 42 is preferably welded to the body portion 44. Next, a sealing device is inserted into the groove 40, and the filter element 30 is inserted into the opening 36 until the second flange portion 54 engages the first flange portion 38 and/or the sealing device. The clamping device 32 is then placed around the flange portions 38 and 54, and the loop 64 and lever 66 are moved to the engaging position, thereby clamping the filter element 30 to the adapter 28.

During operation of the filtration system 10, a gas stream is pumped into the inlet 22. The gas stream then passes through the filter assemblies 16 where particles are separated from the gas stream by the filter elements 30. The filtered gas stream then exits the filtration system 10 through the outlet 24. The flow of the gas stream may also be reversed so as to backflush the filter elements 30, or to collect particles on the inside surfaces of the filter elements rather than on the outside surfaces.

Because the adapter 28 and filter element 30 are both threadless, the problem of gulling or fusing along threaded surfaces during operation of the filtration system 10 is effectively eliminated. In addition, because the filter element 30 is secured to the adapter 28 using a quick-disconnect clamping device, such as the clamping device 32, the filter element 30 can be quickly and easily removed from the tube sheet 14 without damaging the filter element. As a result, the filter assembly 16 is significantly more reliable and longer lasting as compared with prior art filter assemblies. Furthermore, such a configuration enables sealing devices to be quickly and easily inspected and/or replaced.

The invention has been described in an illustrative manner, and it is to be understood that the terminology which has been used is intended to be in the nature of words of description rather than of limitation. Obviously, many modifications and variations of the invention are possible in light of the above teachings. It is, therefore, to be understood that within the scope of the appended claims, the invention may be practiced otherwise than as specifically described.

What is claimed is:

1. A filter assembly for use with a gas filtration system for separating particles from a high temperature gas stream, the gas filtration system having a support member, the filter assembly comprising:

an adapter adapted to be connected to the support member and having an opening extending therethrough;

a filter element removably connected to the adapter and extending through the opening for separating the particles from the gas stream; and a removable clamping device engaging the adapter and the filter element for removably connecting the filter element to the adapter.

2. The filter assembly of claim 1 wherein the filter element is threadless.

3. The filter assembly of claim 1 wherein the adapter has a first flange portion and the filter element has a second flange portion disposed adjacent the first flange portion.

4. The filter assembly of claim 3 wherein the clamping device engages the first and second flange portions.

5. The filter assembly of claim 1 wherein the clamping device is ring-shaped.

6. The filter assembly of claim 1 wherein the adapter has a groove and the filter assembly further includes a sealing device disposed within the groove and sandwiched between the adapter and the filter element.

7. The filter assembly of claim 1 wherein the clamping device is adjustable.

8. A filtration system for separating particles from a high temperature gas stream, the filtration system comprising:

a vessel having a gas stream inlet and a gas stream outlet;

a support member connected to the vessel between the inlet and the outlet, the support member having an aperture;

an adapter connected to the support member and having an opening aligned with the aperture;

a filter element removably connected to the adapter and extending through the opening for separating particles from the gas stream as the gas stream passes from the inlet to the outlet; and a removable clamping device engaging the filter element and the adapter for removably connecting the filter element to the adapter.

9. The filtration system of claim 8 wherein the adapter and the filter element are threadless.

10. The filtration system of claim 9 wherein the adapter has a first flange portion and the filter element has a second flange portion disposed adjacent the first flange portion.

11. The filtration system of claim 10 wherein the clamping device is removably engaged with the first and second flange portions.

12. The filtration system of claim 11 wherein the clamping device is ring-shaped.

13. The filtration system of claim 8 wherein the adapter is welded to the support member.

14. The filtration system of claim 9 wherein the adapter has a groove and the filter system further includes a sealing device disposed within the groove and sandwiched between the adapter and the filter element.

15. A filtration system for separating particles from a high temperature gas stream, the filtration system comprising:

a vessel having a gas stream inlet and a gas stream outlet;

a support member connected to the vessel between the inlet and the outlet, the support member having a plurality of apertures;

a plurality of adapters connected to the support member, each adapter having an opening aligned with a respective aperture, at least one of the adapters having a first flange portion;

a plurality of hollow filter elements for separating the particles from the gas stream as the gas stream passes from the inlet to the outlet, each filter element being connected to a respective adapter and extending through a respective opening and a respective aperture, at least one of the filter elements having a second flange portion disposed adjacent the first flange portion of the at least one adapter; and a plurality of removable clamping devices, each clamping device engaging a respective adapter and a respective fitting, at least one of the clamping devices being engaged with the first and second flange portions of the at least one adapter and the at least one filter element, respectively.

\* \* \* \* \*